July 12, 1966 T. J. RHODES 3,260,295
AUTOMOBILE WHEEL AND INNER TUBE
Filed June 5, 1964 7 Sheets-Sheet 1
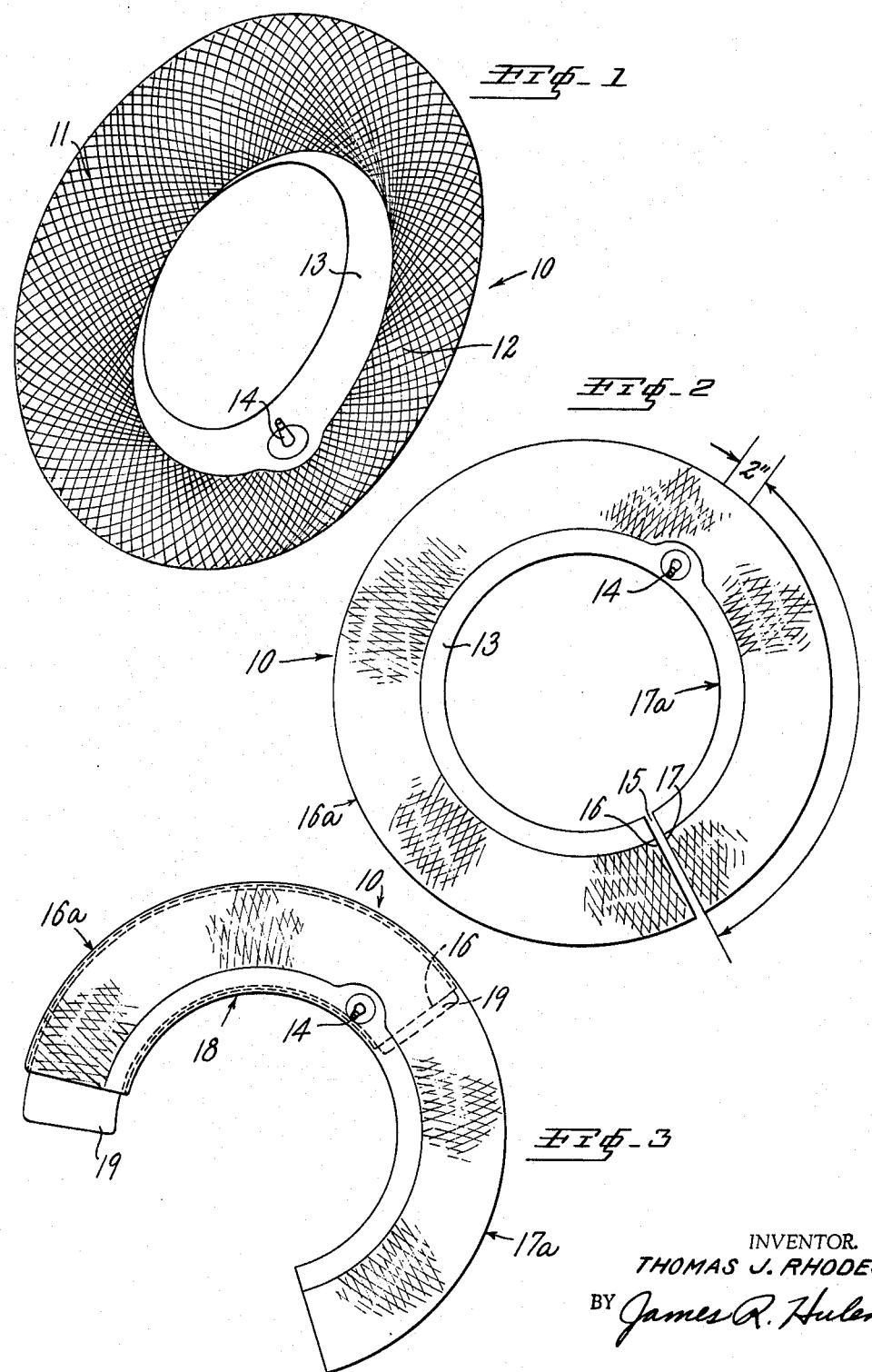
INVENTOR.
THOMAS J. RHODES
BY James R. Hulen
ATTORNEY

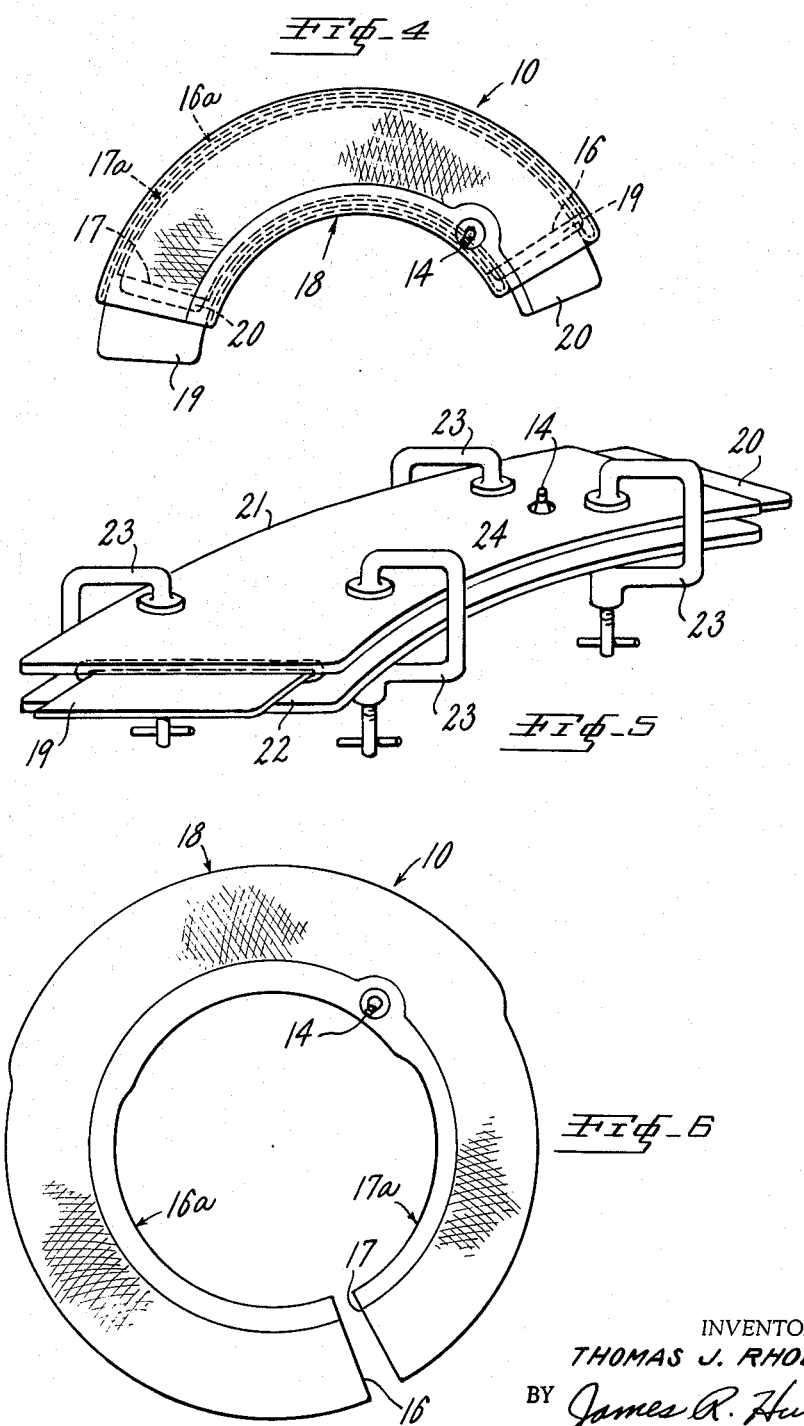

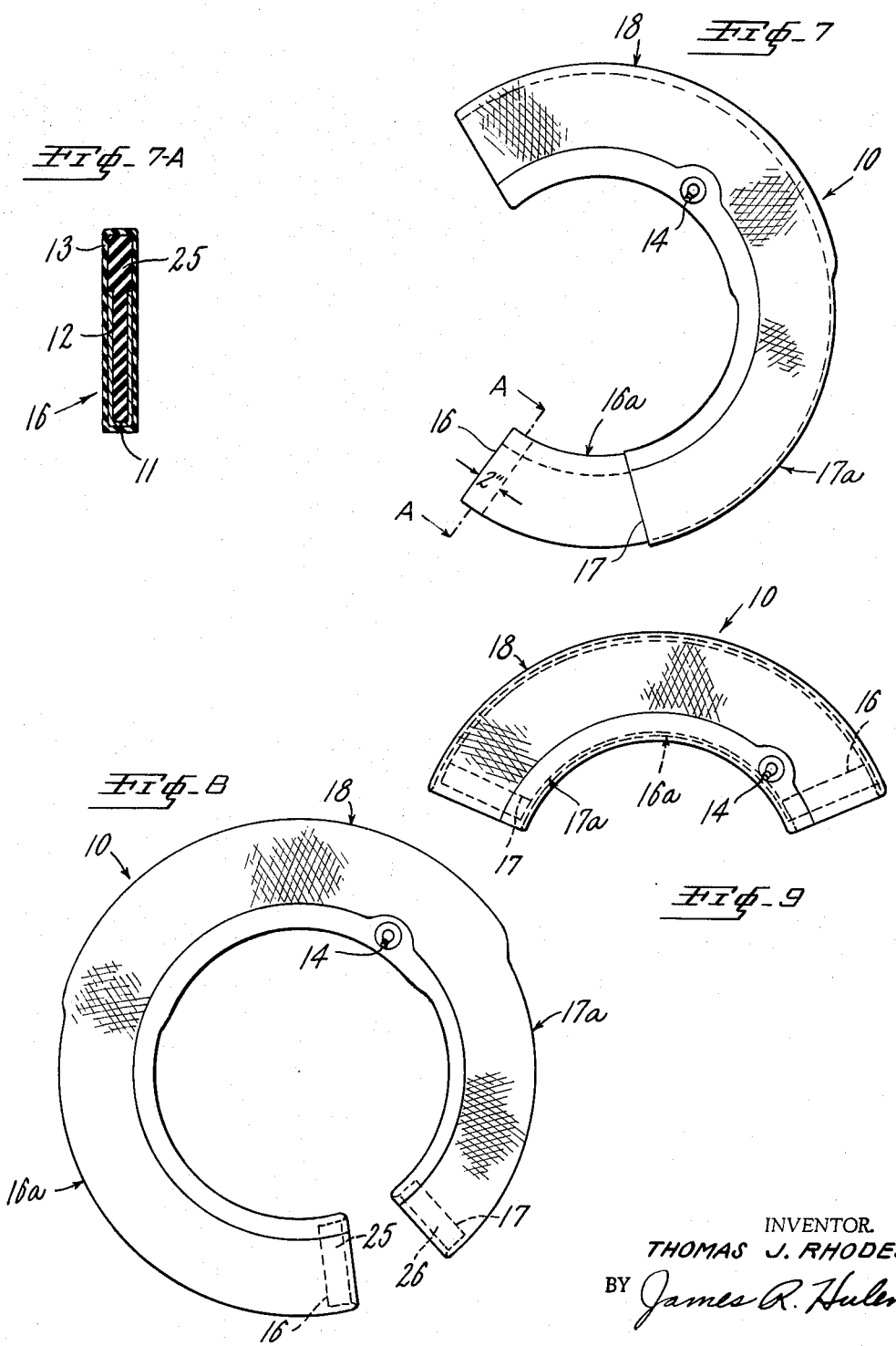

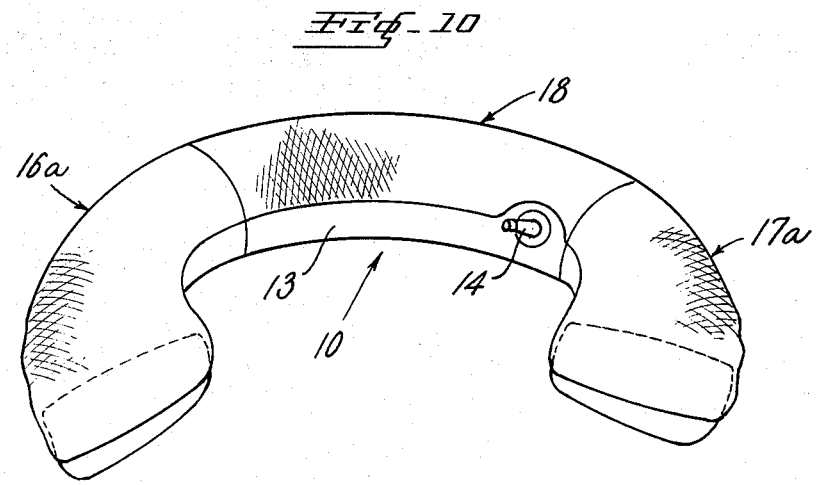
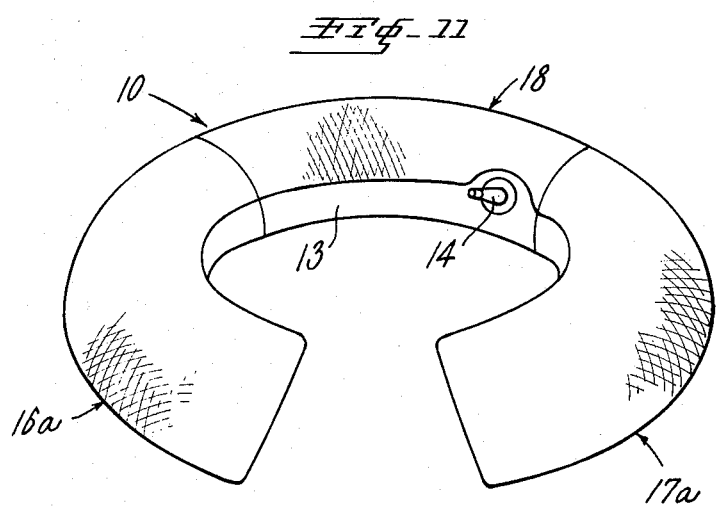

July 12, 1966 T. J. RHODES 3,260,295
AUTOMOBILE WHEEL AND INNER TUBE
Filed June 5, 1964 7 Sheets-Sheet 5
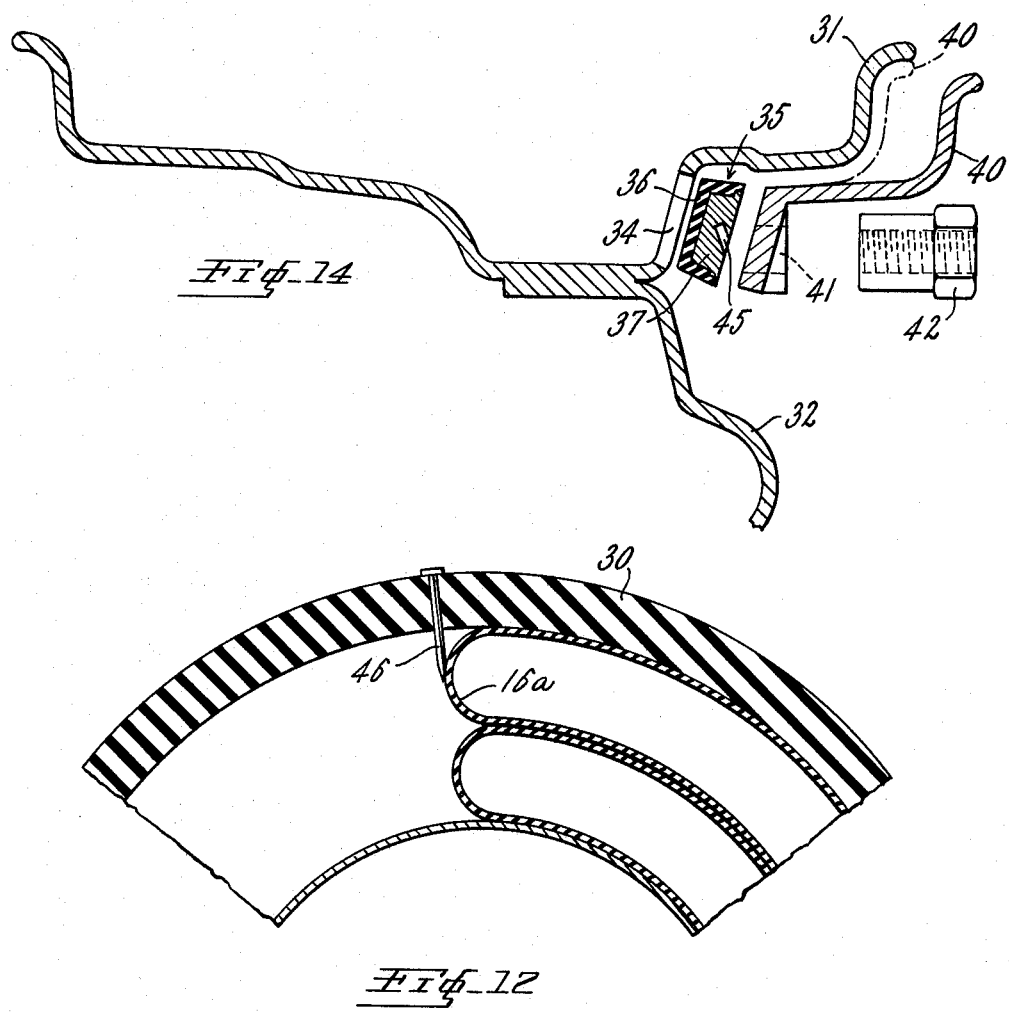
INVENTOR.
THOMAS J. RHODES
BY James R. Hulen
ATTORNEY July 12, 1966   T. J. RHODES   3,260,295
AUTOMOBILE WHEEL AND INNER TUBE
Filed June 5, 1964   7 Sheets-Sheet 6
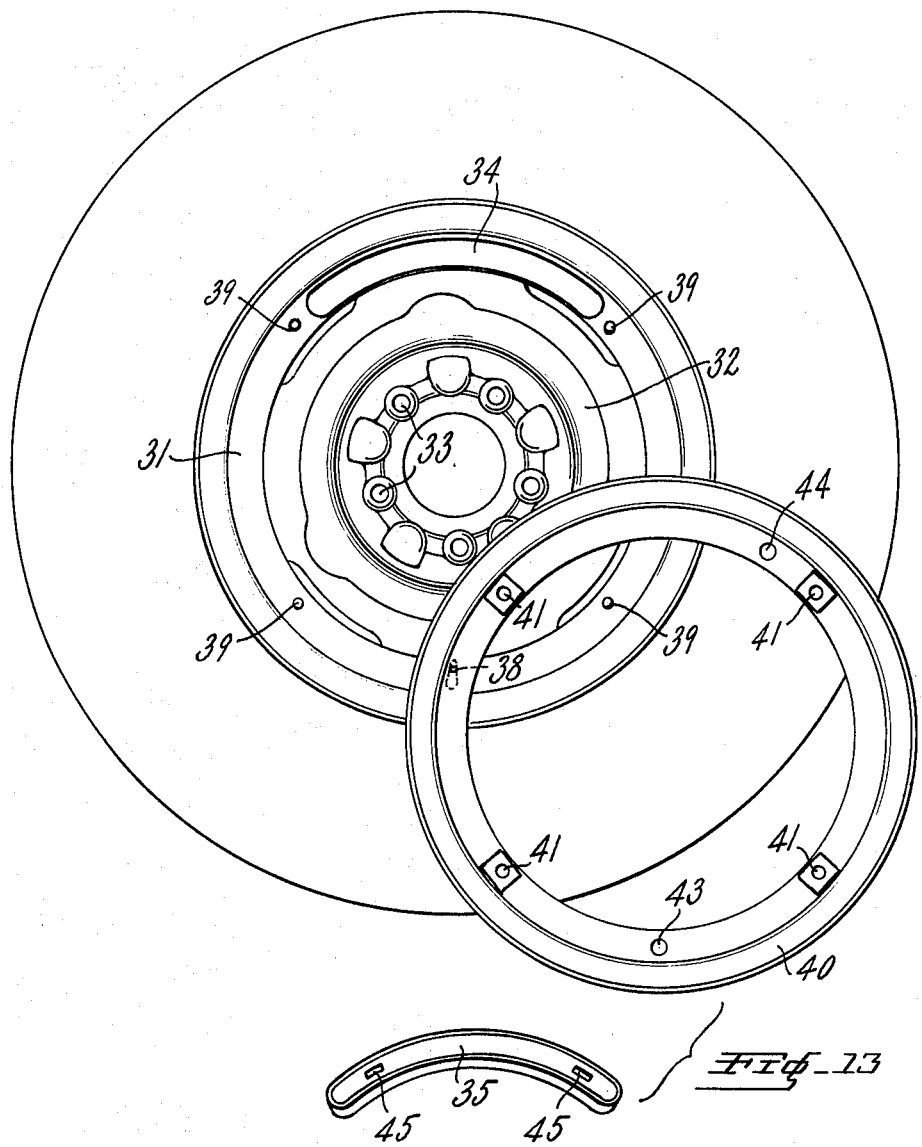
INVENTOR.
THOMAS J. RHODES
BY James R. Hulen
ATTORNEY July 12, 1966 T. J. RHODES 3,260,295
AUTOMOBILE WHEEL AND INNER TUBE
Filed June 5, 1964 7 Sheets-Sheet 7

INVENTOR.
THOMAS J. RHODES
BY James R. Hulen
ATTORNEY

United States Patent Office 3,260,295
Patented July 12, 1966

1

3,260,295
AUTOMOBILE WHEEL AND INNER TUBE
Thomas J. Rhodes, Kinnelon, N.J., assignor to United States Rubber Company, New York, N.Y., a corporation of New Jersey
Filed June 5, 1964, Ser. No. 372,782
13 Claims. (Cl. 152—330)

This invention relates to the elimination of spare tires and, more particularly, to new and improved inner tube and rim constructions and methods for the emergency repair of pneumatic tires.

The advent of the modern tire has greatly decreased the occurrences of tire difficulties on the road. Consequently, the automobile manufacturers have been seeking a satisfactory way to entirely eliminate the spare tire and still provide the motorist with a safe and rapid means for temporarily repairing a defective tire until a permanent repair can be effected.

Accordingly, it is an object of this invention to provide a means and method for accomplishing the temporary repair of a defective pneumatic tire.

A further object is to provide a means and method for tire repair that does not require removal of any part of the tire from the rim or removal of the wheel from the axle.

A still further object of this invention is to provide a new and improved discontinuous inner tube construction that is extremely compact and flexible and, yet, may be inflated within the interior of a mounted tire without fear of damage to the tube by foreign objects in the tire.

Another object is to provide a novel rim construction that provides access to the interior of a mounted tire; that adds structural elements to a standard rim construction without disturbing the wheel balance during normal operating conditions; and that reinforces the standard rim construction without adversely affecting the appearance of the tire.

A further object is to provide a means and method for repairing a tire without jacking up the car or handling heavy tools.

These and other objects are accomplished in accordance with this invention which comprises, in combination, a tubeless pneumatic tire mounted on an annular rim, the rim, having an opening for providing access to the interior of the tire, a first inflation valve mounted on the rim in communication with the tire interior; a discontinuous inflated inner tube substantially filling the tire interior; a second inflation valve carried by the tube in communication with the interior thereof, said second valve extending through the opening in the rim; and a retaining plate secured to the outer portion of the rim and covering the opening to prevent bulging of the tube therethrough, the retaining plate having an aperture for receiving the second inflation valve.

The preferred method of effecting the above described tire repair comprises the steps of providing an opening in the rim on which the tire is mounted to provide access to the interior of the tire, placing a discontinuous tube into the tire interior through the opening, the tube having end portions invaginated into a central tube portion, closing the opening to retain the tube within the tire interior, and inflating the tube, thereby, forcing the end portions from within the central portion of the tube to substantially fill the tire interior.

2

In accordance with the present invention, the preferred inner tube construction for use with the above method comprises a central tube portion, a valve in the central portion, a first tube portion integral with one end of the central portion and invaginated into the central portion, and a second tube portion integral with the other end of the central portion and invaginated into the central portion, the ends of the first and second tube portions remote from the central portion being sealed to form an air impermeable chamber within the tube portions.

For a better understanding of the present invention together with other and further objects thereof, reference is made to the following description, taken in connection with the accompanying drawings, and its scope will be pointed out in the appended claims.

Referring now to the drawings:

FIG. 1 is a perspective view of an inner tube used in the construction of the new and improved inner tube of the present invention;

FIG. 2 is a side elevational view of the inner tube shown in FIG. 1 illustrating the initial step in the manufacture of the inner tube of the present invention;

FIG. 3 is a side elevational view illustrating a further step in the manufacture of the inner tube of the present invention;

FIG. 4 is a side elevational view further illustrating the manufacture of the inner tube of the present invention;

FIG. 5 is a perspective view of an apparatus used in the manufacture of the inner tube;

FIG. 6 is another side elevational view further illustrating the manufacturing of the inner tube;

FIG. 7 is a side elevational view illustrating the position of the tube during a further step in the manufacturing of the inner tube;

Figure 15:
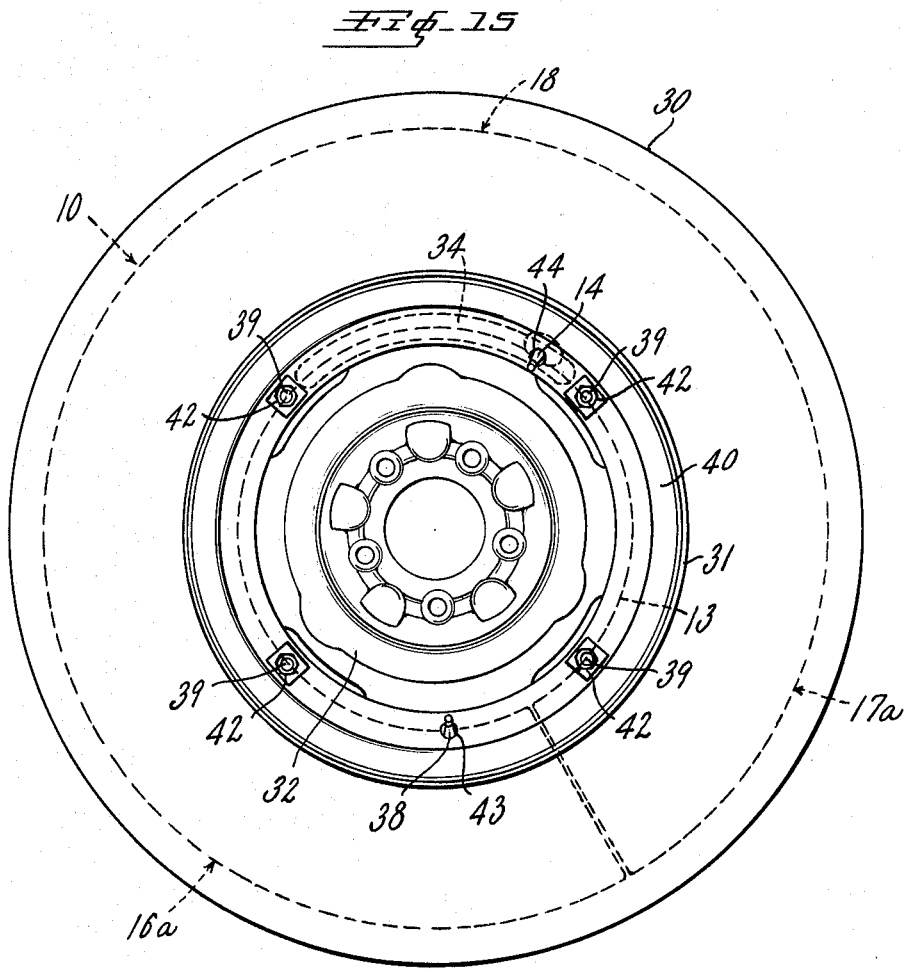

FIG. 7-A is a cross-sectional view taken along line A—A of FIG. 7;

FIG. 8 is a side elevational view of the inner tube of the present invention;

FIG. 9 is a side elevational view of the inner tube of the present invention illustrated as it is stored and initially used;

FIG. 10 is a perspective view of the inner tube of the present invention shown in a partially inflated condition;

FIG. 11 is a perspective view of the inner tube of the present invention illustrated in a fully inflated condition;

FIG. 12 is a schematic illustrating the unfolding of the inner tube of the present invention within a mounted pneumatic tire;

FIG. 13 is a side elevational view showing the disassembled components of the rim portion of the present invention;

FIG. 14 is a cross-sectional assembly drawing showing the relationship of the various components illustrated in FIG. 13; and FIG. 15 is a side elevational view of a wheel illustrating the relationship of the tube and rim constructions of the present invention.

The preferred method of manufacturing the inner tube of the present invention is illustrated in FIGS. 1 through 9. Referring to FIG. 1, an inner tube shown generally at 10 is formed in accordance with conventional practice. Tube 10 has a crown 11 and sidewalls 12 that are reinforced with two plies of nylon fabric. An unreinforced rubber rim area 13 has an inflation valve 14 therein. One method of manufacturing the above described inner tube may be found in United States Patent No. 2,699,194 which issued on January 11, 1955 to A. N. Iknayan. Tube 10 is made of light gauge (.050 inch) rubber and is consequently, quite flexible. The interior of tube 10 is equipped with a self-sealant such as that described and claimed in United States Patent No. 2,802,505 which issued on August 13, 1957 to L. C. Peterson et al.

The initial step in the manufacture of the inner tube of the present invention is illustrated in FIG. 2. Tube 10 is placed in a flattened condition and a cut is made through the tube as shown at 15. The location of cut 15 is determined by measuring approximately two inches along the outer circumference of the tube from valve 14 and then laying off approximately one-third of the circumference of tube 10 to determine the location. Cut 15 results in two open ends 16 and 17 in tube 10.

After cut 15 has been made, a tube end portion 16a, which constitutes approximately one-third of the length of tube 10 beginning at end 16, is invaginated or turned inwardly into the central tube portion 18 (see FIG. 3). A thin arcuately shaped metal forming plate 19 is then inserted into invaginated portion 16a. Plate 19 extends completely through the invaginated portion 16a and extends beyond end 16 by approximately one-half inch.

Referring to FIG. 4, the next step in the tube forming operation is to invaginate end 17 into central portion 18 in overlapping relationship with end portion 16a. A second metal forming plate 20 is then inserted into the second invaginated tube portion 17a and extends beyond tube end 17. Forming plate 20 is approximately one-eighth inch narrower than plate 19.

With tube 10 in the above described condition, a pair of metal plates 21 and 22 (see FIG. 5) are placed on opposite sides of the tube assembly and clamped tightly in place by clamps 23. An aperture 24 is provided in plate 21 to provide an opening for valve 14. With the tube portions thus tightly clamped between plates 21 and 22, the entire unit is placed in an oven for approximately one-half hour at 275° F. to heat-set the tube rubber and reinforcing fabric in the flattened and invaginated condition.

After completion of the heating operation, clamps 23 and plates 21 and 22 are removed and forming plates 19 and 20 are withdrawn from the tube. The tube is unfolded as shown in FIG. 6. It will be apparent that a slight reduction in the cross-section of tube portions 16a and 17a will result from heat-setting the invaginated portions with the metal forming plates inserted therein. FIG. 6 illustrates that the central tube portion 18, with inflation valve 14 therein, is approximately the same size as the original tube 10 and tube portion 16a is slightly smaller. Likewise, tube portion 17a which had a forming plate narrower than that used for tube portion 16a will be slightly smaller in cross-section than tube portion 16a.

The next step in the manufacture of the inner tube of the present invention is to seal tube ends 16 and 17 to form an air impermeable chamber within tube portions 16a, 17a and 18. Referring to FIG. 7, the sealing of end 16 is accomplished in a slightly different manner than that of end 17. End 16 is invaginated completely through the remainder of the tube and extended beyond end 17. Prior to invaginating end 16, an area immediately adjacent the end approximately two inches wide is buffed for further processing. To seal the end, the two inch wide buffed surface is cemented with any conventional rubber cement and a gum filler strip 25 is placed within end 16 (see FIG. 7-A). End 16 with gum 25 therein is then flattened out on a hot plate and cured in accordance with conventional practice to form an air impermeable seal over end 16.

Since end 16 has already been sealed, end 17 must be sealed without invaginating the end entirely through the tube. End 17 is buffed to provide a two inch surface which is then turned inwardly and cemented. A gum strip 26 (see FIG. 8) similar to strip 25 is then placed adjacent the buffed surface within end 17. The two inch area is then flattened out on a hot plate and cured. It will be apparent that a longer curing time is required to seal end 17 than that required for end 16 because it is cured through four thicknesses of tube wall, whereas, end 16 is merely cured through two wall thicknesses. The finished tube is illustrated in FIG. 8 wherein a central tube portion 18 and two end tube portions 16a and 17a (having reduced cross-sections) each constitute approximately one-third of the overall tube length and form an air impermeable chamber which is sealed at the tube ends 16 and 17.

In order to form a flat compact package for storage purposes and ease of handling, the end portions 16a and 17a are again invaginated into the central tube portion 18 as shown in FIG. 9. In order that the tube package may be made as thin as possible, vacuum may be applied to valve 14 to remove air from the tube. The tube may be stored in a very compact compartment since it has been heat-set into a flat construction and the central portion 18 constitutes only about one-third of the overall circumference of the tube. The use of this tube for effecting emergency tire repair will be described hereinbelow.

Referring to FIG. 13, a conventional pneumatic tire 30 is shown mounted on a standard annular rim 31. Rim 31 is supported by a central hub portion 32 which is adapted to be secured to the axle of an automobile through openings 33. A slot or opening 34 is cut through rim 31 to provide access to the interior of tire 30 mounted on the rim. Opening 34 is approximately eight and one-half inches long and one inch wide. During normal operation of tire 30, a plug 35 (see FIG. 14) having a rubber gasket 36 and a metal core 37 is placed into opening 34 to seal the air inside the rim. Rim 31 is also equipped with a valve 38 which is a conventional tubeless tire inflation valve.

Four threaded studs 39 are secured to rim 31 and provide a means for securing retaining plate or ring 40 to the rim. Retaining ring 40 has apertures 41 therethrough corresponding to studs 39 and the ring is secured to the studs by nuts 42 (see FIG. 15). An aperture 43 extends through retaining ring 40 to receive inflation valve 38 and another aperture 44 extends through retaining ring 40 to receive inflation valve 14 of inner tube 10 in a manner to be described hereinbelow.

The assembly of the various components illustrated in FIG. 13 is shown in FIG. 14. Under normal driving conditions, a tire is seated on rim 31 and fully inflated by inflation valve 38. Sealing plug 35 having tapered sides is firmly forced into opening 34 to form an air impermeable seal. Plug retaining ring 40 is positioned in overlying relationship to rim 31 and secured to studs 39 by nuts 42. With retaining ring 40 thus in position, plug 35 will be held securely within opening 34. Furthermore, the contour of retaining ring 40 is substantially identical to the contour of the outer portion of rim 31 and, when firmly secured to the outer portion of the rim, provides a reinforcing structure for the rim as shown in broken lines in FIG. 14.

The above described rim assembly is not only effective for providing an efficient sealing means for the interior of the tire and an effective reinforcing structure for rim 31, but it also provides a wheel that is essentially in balance at all times even though additional structure has been added to the rim. This wheel balancing is accomplished by providing a plug 35 that is essentially the same weight as the section of rim that has been removed to provide opening 34 and also by providing an annular plug retaining ring that is secured to the rim by substantially evenly spaced securing means.

When it is necessary to effect the emergency repair of a tire, the motorist must merely perform the following procedures. The wheel is turned until opening 34 is in the upper position as shown in FIG. 13. Retaining ring 40 is then removed from rim 31 by removing nuts 42. This is a very simple operation and only requires the use of a very light wrench or other tool. When ring 40 has been removed, plug 35 is pried loose from opening 34 by inserting a screwdriver or other tool into the slots 45 (see FIG. 14) provided in the metal core of the plug. After removing plug 35, inner tube 10, which is in the invaginated condition shown in FIG. 9, is placed into the interior of the tire through opening 34. Retaining ring 40 is again placed on rim 31 and inflation valve 14 in tube 10 is placed through aperture 44 in the ring. Ring 40 is then tightly secured to the rim by nuts 42 and a small can of pressurized Freon is attached to valve 14 to partially inflate inner tube 10. The car is then driven forward one-half of a revolution of the wheel to place opening 34 on the lower portion of rim 31. The inner tube is then fully inflated to substantially fill the interior of the tire. It has been found to be desirable to follow the above-described procedures when the defective tire remains on the ground. This gives the inner tube the maximum degree of freedom to expand and fill the tire. It will be apparent that the turning of the wheel will not be necessary if the motorist chooses to raise the tire off the ground by jacking up the car. This eliminates the constricted area formed at the point of contact between the wheel and the ground and permits the inner tube to freely unfold within the tire interior.

FIGS. 10 and 11 illustrate the condition of inner tube 10 when in the partially filled and fully filled conditions, respectively.

A very important aspect of the present invention is the manner in which tube 10 unfolds during the inflation thereof. FIG. 12 schematically illustrates the unfolding of tube portion 16a within tire 30 in which a nail 46 has become imbedded. The tube portion 16a rolls out of itself in a uniform manner with little or no sliding on the tire surface. This action tends to envelope the nail and prevents tearing of the inner tube. Since the inner tube is provided with a self-sealing fluid, the air retention is ample to provide the motorist with many safe driving miles. If the tube portions 16a and 17a were not invaginated into the central tube portion, the tube, when inflating, might tend to slide along the interior of the tire and any nails or other foreign objects would tear or otherwise injure the tube, thus rendering the tube ineffective. However, it is more likely that the tube, if not in the invaginated condition, would tend to become constricted inside the tire and burst at the sealed ends due to excessive pressure upon inflation.

Referring to FIG. 15, the repaired wheel is shown completely assembled with tube 10 fully inflated and substantially filling the interior of tire 30. Retaining ring 40 is secured to rim 31 to provide a reinforcing structure for the rim and to block opening 34 to prevent inner tube 10 from bulging therethrough. Because of the reinforcing fabric on the inner tube, the tube will be equally as effective in the repair of blowouts as it is in the repair of simple punctures. The fabric will prevent the tube from bulging through the defective area of the tire and thereby provide an effective tire repair.

It will be apparent from the foregoing description that the present invention provides an extremely effective means and method for accomplishing the temporary repair of a defective pneumatic tire. The repair is accomplished without the removal of any part of the tire from the rim or removal of the wheel from the axle. Furthermore, the invention provides a completely novel inner tube and rim construction that provides numerous advantages.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

1. An inner tube comprising: a central tube portion; a valve in said central portion; a first tube portion integral with one end of said central portion and having a cross-section smaller than said central portion; and a second tube portion integral with the other end of said central portion and having a cross-section smaller than said first tube portion, the ends of said first and second tube portions remote from said central portion being sealed to form an air impermeable chamber within said tube portions.

2. The inner tube of claim 1 wherein each of said tube portions constitutes approximately one-third of the overall length of said tube.

3. The inner tube of claim 1 wherein the crown and sidewalls of said tube portions are reinforced with fabric.

4. An inner tube comprising: a central tube portion; a valve in said central portion; a first tube portion integral with one end of said central portion and invaginated into said central portion; and a second tube portion integral with the other end of said central portion and invaginated into said central portion, the ends of said first and second tube portions remote from said central portion being sealed to form an air impermeable chamber within said tube portions.

5. The inner tube of claim 4 wherein said first and second tube portions are entirely invaginated into said central portion in an overlapping relationship.

6. The inner tube of claim 5 wherein each of said tube portions constitutes approximately one-third of the overall length of said tube.

7. The tube of claim 6 wherein the cross-section of said first tube portion is smaller than said central portion and the cross-section of said second tube portion is smaller than said first portion, so that said first and second portions may be easily invaginated and provide a flat compact structure within said central portion.

8. A wheel comprising: an annular rim for supporting a pneumatic tire, said rim having an opening for providing access to the interior of said tire; a removable plug in said opening; and an annular retaining ring removably secured to the outer portion of said rim for retaining said plug within said opening, said retaining ring having a contour similar to the contour of said outer rim portion and overlying said portion to provide a reinforcing structure for said rim.

9. The wheel of claim 8 wherein said retaining ring is secured to said rim by substantially evenly spaced securing means.

10. In combination, a tubeless pneumatic tire mounted on an annular rim, said rim having an opening for providing access to the interior of said tire; a first inflation valve mounted on said rim in communication with said tire interior; a discontinuous inflated inner tube substantially filling said tire interior; a second inflation valve carried by said tube in communication with the interior thereof, said second valve extending through said opening; and an annular retaining ring having a contour similar to the contour of the outer portion of said rim and overlying and secured to the outer portion of said rim and covering said opening to prevent bulging of said tube therethrough, said retaining ring having an aperture for receiving said second inflation valve.

11. The combination of claim 10 wherein said second valve is located in the central one-third portion of said tube and the crown and sidewall portions of said tube are reinforced with fabric.

12. The combination of claim 11 wherein said tube has a self-sealant therein.

13. The combination of claim 10 wherein said opening is elongated and extends over approximately one-fourth of the circumference of said rim.

(References on following page)

References Cited by the Examiner

UNITED STATES PATENTS

| | | | |
|---|---|---|---|
| 1,258,506 | 3/1918 | Wallace | 156—120 |
| 1,455,038 | 5/1923 | Bledsoe | 152—350 |
| 1,455,364 | 5/1923 | Stephenson | 156—120 |
| 1,465,867 | 8/1923 | Riley | 152—350 |
| 2,203,564 | 6/1940 | Farnsworth | 152—330 |
| 2,847,049 | 8/1958 | Blomquist | 152—330 |
| 2,866,494 | 12/1958 | Sanderson | 156—97 |
| 2,974,715 | 3/1961 | Soares et al. | 156—97 |

FOREIGN PATENTS

| | | |
|---|---|---|
| 11,107 | 1896 | Great Britain. |
| 8,597 | 1907 | Great Britain. |

ARTHUR L. LA POINT, *Primary Examiner.*

C. W. HAEFELE, *Assistant Examiner.*